Jan. 8, 1957.  J. G. LINVILL  2,777,115

BRANCHING CIRCUIT

Filed March 3, 1955  2 Sheets-Sheet 1

INVENTOR
J. G. LINVILL
BY Alan C. Rose
ATTORNEY

INVENTOR
J. G. LINVILL
BY Alan C. Rose
ATTORNEY

United States Patent Office 2,777,115
Patented Jan. 8, 1957

2,777,115

BRANCHING CIRCUIT

John G. Linvill, Whippany, N. J., assignor to Bell Telephone Laboratories, Incorporated, New York, N. Y., a corporation of New York Application March 3, 1955, Serial No. 491,897

8 Claims. (Cl. 333—8)

The present invention relates to branching circuits, and more particularly to circuits for connecting all of a plurality of subsidiary circuits with a single main circuit while concurrently isolating the subsidiary circuits from each other.

The hybrid junction is the classical circuit component employed for interconnecting a single main circuit with two subsidiary circuits while isolating the subsidary circuits from each other. Conventional hybrid circuits normally use multicoil transformer arrangements to effect the coupling between the main circuit and the subsidiary circuits; opposed coils prevent intercoupling of energy between the two subsidiary circuits.

The conventional hybrid has a number of disadvantages, including, for example, frequency limitations, excessive weight, and the number of circuits which may readily be accommodate. The frequency limitations of conventional hybrids including transformers arise from the tendency of the magnetizing inductance to short out the input signals at low frequencies, and the unduly high series impedance of the leakage inductance of the transformer structures at high frequencies.

Accordingly, one object of the present invention is to increase the frequency bandwidth of branching circuits of the hybrid type.

The matter of the exessive weight of conventional hybrid structures is obvious; the ferromagnetic transformer structures are naturally moderately heavy. Therefore, another object of the present invention is to reduce the weight of branching circuits of the class discussed above.

When it is desired to connect one main circuit to three or more subsidiary circuits, and maintain isolation between the subsidiary circuits, more than one hybrid component of the conventional type is required. Consequently, the required circuits become somewhat elaborate.

A further object of the present invention is to simplify branching circuits in which three or more isolated subsidiary circuits are all connected to a single main circuit.

In accordance with the principles of the invention, a negative impedance converter and associated impedance elements are employed to provide an improved branching circuit. A negative impedance converter is an electrical unit which has the following properties. First, when a positive impedance is connected to one of its two pairs of terminals, the impedance seen at its other pair of terminals is equal to the positive impedance multiplied by the magnitude of the impedance conversion factor of the converter, and has a negative sign. Secondly, signal currents applied to one pair of terminals of the converter appear as proportional currents at the other pair of terminals. References to several articles and patent applications disclosing negative impedance converters appear below.

In the present invention, a main circuit is connected to one of the two pairs of terminals of a negative impedance converter. Because of the fundamental property of a negative impedance converter, a negative impedance is observed at the second pair of terminals. A positive impedance element of the proper value to annul the observed negative impedance is connected to the second pair of terminals. When a plurality of branch or subsidiary circuits are coupled to the annulling impedance element, isolation between these branch circuits may be obtained, concurrently with coupling of each branch circuit with the main circuit.

The physical reason for this mode of coupling may be apprehended from a consideration of a preferred form of the invention. In a preferred form of the invention, the main circuit is connected to one of the two pairs of terminals of the negative impedance converter, and the positive impedance element is connected in series circuit with the second pair of terminals. The positive series impedance element is of the proper magnitude to annul the negative impedance observed at the second pair of terminals of the negative impedance converter. Accordingly, the impedance of the positive impedance element and the negative impedance converter seen at any point in this series circuit appears to be equal to zero. Several subsidiary or branch circuits are connected in parallel to a pair of branching points in this series circuit. Signals from any of the subsidiary circuits naturally flow toward the zero impedance path through the negative impedance converter to the main circuit, rather than toward the other subsidiary circuits which each include substantial impedance.

The use of a negative impedance converter instead of a transformer structure as the central component of the branching network avoids several of the limitations mentioned hereinabove. Specifically, branching circuits employing negative impedance converters may have exceedingly broad bandwidths, and may readily accommodate more than two subsidiary circuits. In addition, negative impedance converters employing transistors may be substantially smaller and lighter in weight than the conventional hybrid circuit employing transformers.

Other objects and various advantages and features of the invention will become apparent by reference to the following description taken in connection with the appended claims and the accompanying drawings forming a part thereof.

Figure 1:
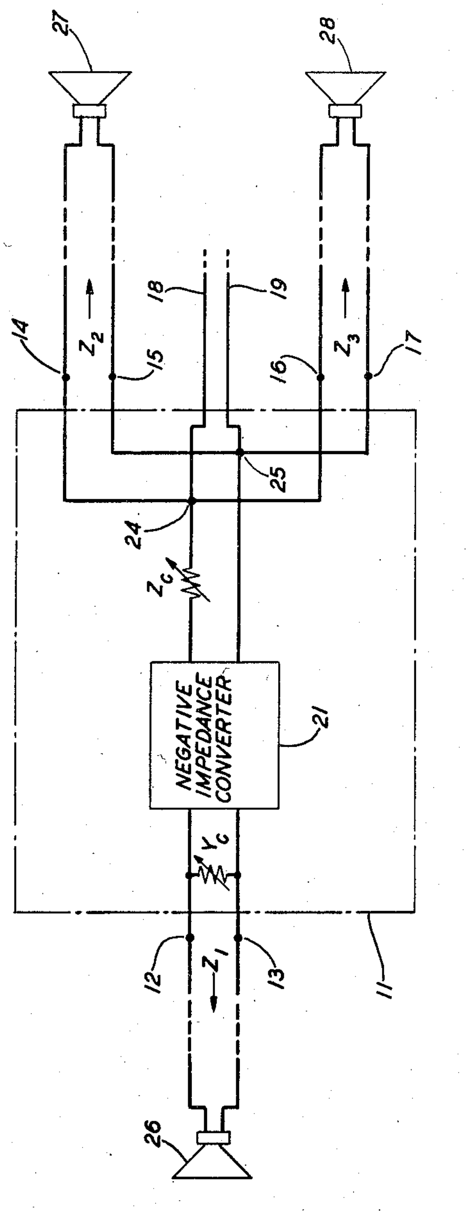
Fig. 1 illustrates a branching circuit in accordance with the invention employed in an intercommunication system.

Referring more particularly to the drawings, Fig. 1 shows, by way of example and for purposes of illustration, a branching circuit 11 enclosed in a dashed line box. The circuit 11 has a first pair of terminals 12 and 13, a second pair of terminals 14 and 15, and a third pair of terminals 16 and 17. Another circuit including the leads 18 and 19 will be discussed hereinafter. As in the usual transformer hybrid circuits, signals applied at terminals 12 and 13 divide, and are coupled to terminals 14 and 15 and to terminals 16 and 17. When a signal is applied to the branching circuit 11 at terminals 14 and 15, however, it is transmitted directly to terminals 12 and 13 and is not coupled to terminals 16 and 17. Similarly, when signals are applied to terminals 16 and 17, they are transmitted to terminals 12 and 13, and little or no signal appears at terminals 14 and 15.

An important element in the present branching circuit is the negative impedance converter 21. A negative impedance converter is an active network having two pairs of terminals. The converter has the unusual property of presenting a negative impedance at one of its pairs of terminals equal in value to the positive impedance connected to the other pair of terminals multiplied by the magnitude of its impedance conversion factor. The foregoing and other properties of negative impedance converters have been disclosed in detail in the following articles: "A negative impedance repeater," by J. L. Merrill, Jr., Transactions of the American Institute of Electrical Engineers, volume 70, part 1, pages 49 through 54, 1951; "Theory of the negative impedance converter," by J. L. Merrill, Jr., Bell System Technical Journal, volume 30, pages 88 through 109, January 1951; and "RC active filters" by J. G. Linvill, Proceedings of the I. R. E., volume 42, pages 555 through 564, March 1954.

Applying the principle mentioned in the preceding paragraph to the circuit of Fig. 1, the impedance seen at the right-hand side of the converter 21 is negative in sign and is equal in magnitude to the combined impedance of the elements $Z_1$ and $Y_c$ multiplied by the impedance conversion factor $k$ of the converter 21. The series impedance element $Z_c$ is connected in series with one of the terminals at the right-hand side of the negative impedance converter 21. The value of the positive impedance element $Z_c$ is selected to be equal to the negative of the impedance presented by the converter 21 at its right-hand terminals. Accordingly, the impedance seen at branching points 24 and 25 looking toward the converter 21 is equal to zero.

When signals are applied to terminals 14 and 15, they naturally flow toward the negative impedance converter which appears to have zero impedance, rather than toward the circuit connected to terminals 16 and 17, which has a significant impedance $Z_3$. Similarly, signals applied at terminals 16 and 17 flow toward the negative impedance converter 21, rather than to the higher impedance circuit coupled to terminals 14 and 15.

As illustrated in Fig. 1, the branching circuit 11 may be employed in an intercommunication system. Under these circumstances, the electro-acoustic transducers 26, 27 and 28 are connected respectively to the terminal pairs 12—13, 14—15, and 16—17. The transducer 26 is located at the main communication center, and the transducers 27 and 28 are located at subordinate stations. Accordingly, when information is spoken into the transducer 26, it is audible at both subordinate stations 27 and 28. However, when a person speaks into either of the transducers 27 or 28 located at the subsidiary stations, an audible signal is heard only at the main station 26.

A concrete example of impedance computations for the branching circuit 11 of Fig. 1 will now be presented. One requirement for the branching circuit 11 is that the impedance of the circuit seen at terminals 12 and 13 be equal to the impedance $Z_1$, so that no impedance discontinuity is observed. This may be expressed mathematically as follows:

$$Z_1=\frac{1}{Y_c+(-k)\frac{1}{Z_c+\frac{Z_2Z_3}{Z_2+Z_3}}} \qquad (1)$$

Assuming that $Z_1$, $Z_2$, $Z_3$ and $k$ are all equal to 1, this becomes:

$$1=\frac{1}{Y_c+(-1)\frac{1}{Z_c+\frac{1}{2}}} \qquad (2)$$

The other requirement is that the impedance $Z_c$ shall be equal to the combined impedance of $Z_1$ and $Y_c$. This may be expressed mathematically as follows:

$$Z_1=\frac{1}{Y_c+\frac{1}{Z_1}} \qquad (3)$$

With $Z_1$ assumed to be equal to 1, Equation 3 becomes:

$$Z_c=\frac{1}{1+Y_c} \qquad (4)$$

When the two simultaneous Equations 2 and 4 are solved, the admittance $Y_c$ may be determined to be equal to $\sqrt{5}$, or 2.236 mhos, and the impedance $Z_c$ is equal to $$\frac{1}{1+\sqrt{5}}$$

or .309 ohm.

When the branching circuit 11 of Fig. 1 is considered in terms of the effect on signals applied to the three pairs of external terminals 12—13, 14—15, and 16—17, it appears to operate in much the same manner as a conventional hybrid circuit. However, in the circuit of Fig. 1, isolation is obtained by the use of a negative impedance converter and associated networks which present zero impedance at the branching points 24, 25. Therefore, one or more additional subsidiary circuits, as indicated by the leads 18, 19 may be added at points 24, 25. To obtain isolation after the addition of another circuit at 18, 19 would only require slight adjustment of the impedances $Y_c$, $Z_c$. This is in contradistinction to the usual hybrid circuits in which only two isolated subsidiary circuits may be employed with a single hybrid.

Figure 2:
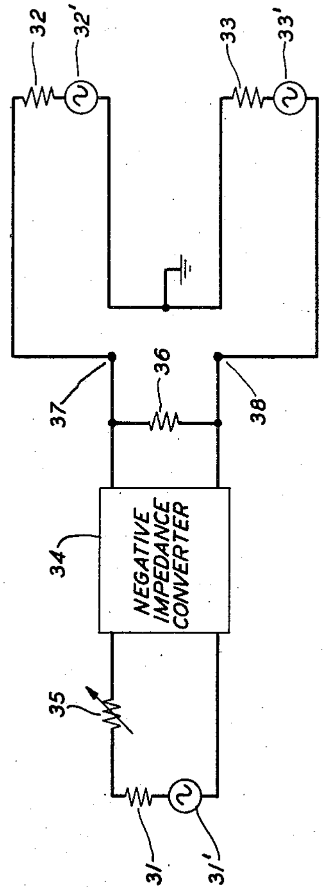
Fig. 2 shows an alternative form of branching circuit.

Another branching circuit using negative impedance converters is shown in Fig. 2. In this figure, the load impedances are designated 31, 32 and 33, and their associated signal sources are designated 31', 32' and 33', respectively. The impedance elements associated with the negative impedance converter 34 are designated 35 and 36. Signals applied at 31' are coupled to both the load impedances 32 and 33; while signals applied at 32' or 33' are coupled to 31, but not to the load elements 33 and 32, respectively, in the other branch circuit. In the circuit of Fig. 2, the impedance observed at the right-hand side of the converter 34 is negative and is equal in magnitude to the combined impedance of elements 31 and 35 multiplied by the magnitude of the impedance conversion factor of the converter 34. The shunt impedance 36 is of the proper magnitude to annul this negative impedance. The mathematical expression for the combination of two parallel impedances is equal to their product divided by their sum. Because the impedance presented by the converter 34 is equal in magnitude to that of element 36 but opposite in sign, the denominator of the mathematical expression is equal to zero. Accordingly, the combined impedance presented by the converter 34 and impedance 36 at points 37 and 38 is infinite. In order for signals applied at 32' to be coupled to load element 33, some current must flow through the circuit loop. However, with infinite impedance across terminals 37 and 38, the required flow of current is impossible. Therefore, the circuits 32 and 33 are effectively isolated. Signals applied either at 32' or at 33' do, however, develop a voltage across terminals 37 and 38 at the input to the negative impedance converter 34, and therefore are coupled to the load element 31.

Figure 3:
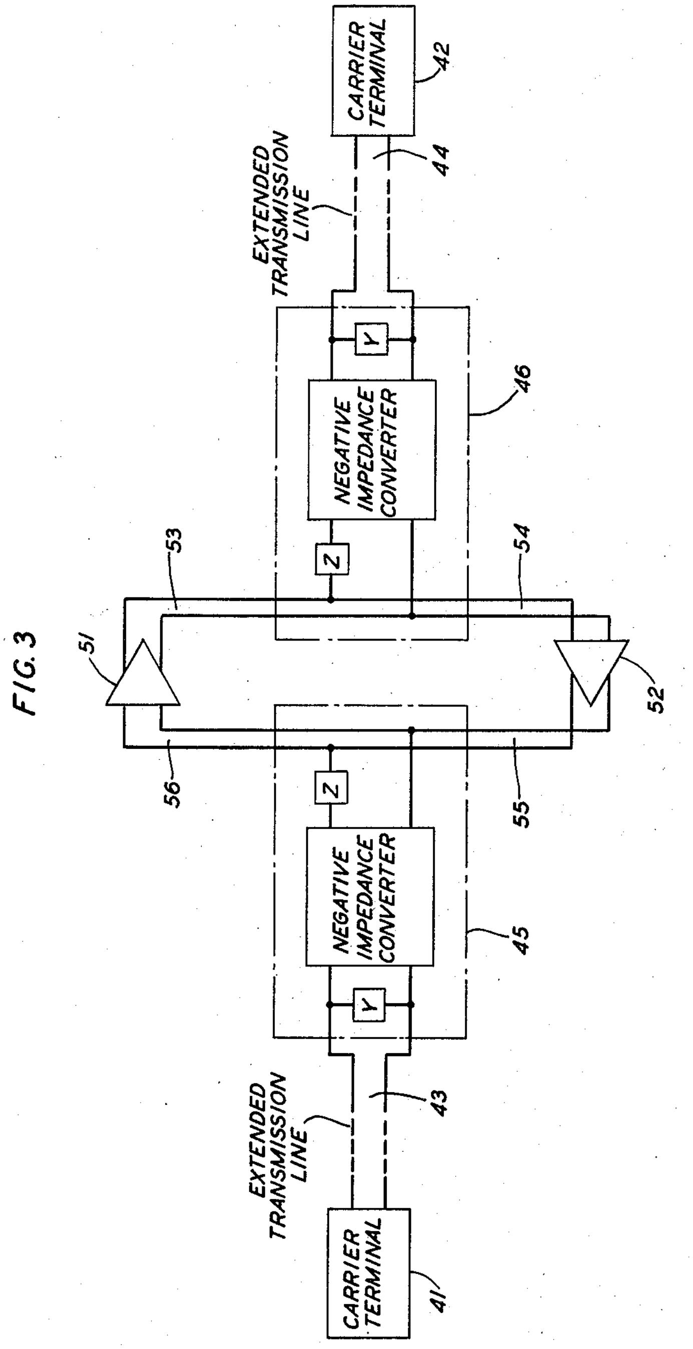
Fig. 3 shows the use of two branching circuits used at an amplification point in an extended carrier transmission line in accordance with the invention.

Fig. 3 illustrates the application of the principles of the invention to a repeater point in an extended carrier transmission line. In Fig. 3, a carrier terminal is indicated at 41. Another carrier terminal 42 is spaced from carrier terminal 41 by a considerable distance, so that amplification of the signals transmitted between these two terminals is essential. In order to conserve transmission facilities, it is desired that the lines 43 and 44 interconnecting carrier terminals 41 and 42 be employed for transmission of signals in both directions. To avoid undesired oscillations at the amplification point, it is necessary that the signals transmitted in the two directions be isolated from each other. This is accomplished by the use of the branching circuits 45 and 46. The circuits 45 and 46 correspond to the circuit 11 of Fig. 1, and are appropriately adjusted to match the impedances of the transmission lines 43 and 44. The amplifier 51 amplifies signals transmitted from carrier terminal 41 to carrier terminal 42; and the amplifier 52 amplifies signals transmitted in the opposite direction.

The need for isolating the amplifiers 51 and 52 may be emphasized by tracing the circuit loop formed by the pairs of leads 53, 54, 55 and 56. In the absence of the isolating effects of the branching circuits 45 and 46, the output of amplifier 51 would be coupled back to its input by way of circuits 53, 54, amplifier 52, and the additional circuits 55 and 56. This would result in serious oscillation. However, because the branching circuits 45 and 46 effectively isolate circuits 55 and 56 as well as circuits 53 and 54, this oscillation does not occur.

In the circuits of Figs. 1 and 2, the external impedances associated with the negative impedance converters have been arranged to assure stability of operation of the branching circuits. As indicated in the above-cited articles, one set of terminals of a negative impedance converter is normally short circuit stable, and the other is open circuit stable. In the circuit of Fig. 1, the short circuit stable pair of terminals of the converter 21 faces to the left, and is connected to the admittance $Y_c$, while the open circuit stable pair of terminals faces to the right and one of these terminals is connected to the impedance $Z_c$. In Fig. 2, however, the open and short circuit stable pairs of terminals of the converter face left and right, respectively.

It is to be understood that the above-described arrangements are illustrative of the application of the principles of the invention. Numerous other arrangements may be devised by those skilled in the art without departure from the spirit and scope of the invention.

Attention is directed to two related patent applications of J. G. Linvill which were filed on March 3, 1955 concurrently with the present application. These applications are Serial No. 491,896 entitled "Branching Arrangement," now Patent 2,757,342, granted July 31, 1956, and Serial No. 491,898 entitled "Computing Circuits."

What is claimed is:

1. A branch circuit for routing signals comprising a negative impedance converter having a first pair of terminals and a second pair of terminals, circuit means having a preassigned total positive impedance and including a terminal impedance and a shunt impedance connected to said first pair of terminals, whereby the impedance presented by the converter at said second pair of terminals is substantially equal in magnitude to said preassigned positive impedance but is negative in sign, a plurality of signal circuits connected in parallel, and impedance means for substantially annulling said negative impedance connected in series with said second pair of terminals and said parallel signal circuits.

2. In combination, a negative impedance converter having a first pair of terminals and a second pair of terminals, said converter having a preassigned impedance conversion factor, circuit means having a total positive impedance and including a terminal impedance and a shunt impedance connected to said first pair of terminals, whereby the impedance presented by the converter at said second pair of terminals is substantially equal to said total positive impedance multiplied by said conversion factor, a plurality of signal circuits connected in parallel, and impedance means for annulling said negative impedance connected in series with said second pair of terminals and said parallel signal circuits, said last-mentioned impedance means being substantially equal in magnitude to said total positive impedance multiplied by said conversion factor.

3. In combination, a negative impedance converter having a first short circuit stable pair of terminals and a second open circuit stable pair of terminals, circuit means having a predetermined total positive impedance and including a terminal impedance connected to said first pair of terminals, whereby the impedance presented by said converter at said second pair of terminals is equal in magnitude to said positive impedance multiplied by the magnitude of the conversion factor of the converter but is negative in sign, impedance means connected to said second pair of terminals for substantially annulling said negative impedance, and a plurality of branch signal circuits connected to said impedance means.

4. In combination, a negative impedance converter having a first pair of terminals and a second pair of terminals, a main two-way transmission circuit connected to said first pair of terminals, a plurality of subsidiary two-way transmission circuits connected to said second pair of terminals, and impedance means for annulling the negative impedance presented by said converter at said second pair of terminals.

5. A combination as defined in claim 4 wherein said subsidiary circuits are connected in parallel.

6. A combination as defined in claim 4 wherein said subsidiary circuits are connected in series.

7. In combination, a negative impedance converter having a first pair of terminals and a second pair of terminals, a main two-way transmission circuit connected to said first pair of terminals, a plurality of subsidiary two-way transmission circuits connected to said second pair of terminals, shunt impedance means connected across said first pair of terminals for matching the impedance of said main transmission line, and additional impedance means connected in series with said second pair of terminals and said subsidiary circuits for annulling the negative impedance presented by the converter at said second pair of terminals.

8. In combination, a negative impedance converter having a first pair of terminals and a second pair of terminals, a main two-way transmission circuit connected to said first pair of terminals, first circuit means comprising a plurality of subsidiary two-way transmission circuits connected to said second pair of terminals, and second circuit means comprising an impedance connected to at least one of said second pair of terminals for annulling the negative impedance presented by said converter at said second pair of terminals, one of said first and second circuit means being connected in series with said second pair of terminals and the other of said circuit means being connected in shunt with said second pair of terminals.

References Cited in the file of this patent

UNITED STATES PATENTS 2,685,066 Barney ---------------- July 27, 1954